United States Patent
Ericson et al.

(10) Patent No.: US 8,804,676 B2
(45) Date of Patent: Aug. 12, 2014

(54) SCHEDULING METHOD

(75) Inventors: Marten Ericson, Lulea (SE); Rutger Andersson, Kista (SE); Mats Blomgren, Stockholm (SE); Klas Johansson, Sundbyberg (SE); Patrik Karlsson, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 123 days.

(21) Appl. No.: 13/260,944

(22) PCT Filed: Apr. 3, 2009

(86) PCT No.: PCT/SE2009/050349
§ 371 (c)(1),
(2), (4) Date: Sep. 29, 2011

(87) PCT Pub. No.: WO2010/114443
PCT Pub. Date: Oct. 7, 2010

(65) Prior Publication Data
US 2012/0020337 A1    Jan. 26, 2012

(51) Int. Cl.
*H04W 72/04* (2009.01)
*H04W 72/12* (2009.01)

(52) U.S. Cl.
CPC ................... *H04W 72/1215* (2013.01)
USPC ..................... 370/336; 455/242.2

(58) Field of Classification Search
USPC ..................... 370/336; 455/242.2
See application file for complete search history.

(56) References Cited

U.S. PATENT DOCUMENTS

| | | | |
|---|---|---|---|
| 6,031,831 A * | 2/2000 | Tan Boon et al. | 370/342 |
| 8,504,056 B2 * | 8/2013 | Fang et al. | 455/453 |
| 2004/0008655 A1 | 1/2004 | Park et al. | |
| 2005/0111397 A1 * | 5/2005 | Attar et al. | 370/319 |
| 2006/0034228 A1 * | 2/2006 | Kim et al. | 370/335 |
| 2008/0049675 A1 * | 2/2008 | Burgan et al. | 370/331 |

FOREIGN PATENT DOCUMENTS

| | | | |
|---|---|---|---|
| GB | 2285724 A * | 7/1995 | |
| WO | 2004084450 A2 | 9/2004 | |

OTHER PUBLICATIONS

"Enhanced Uplink Packet Access in WCDMA", Combined Performance of Advanced Packet Scheduling Techniques, Fast L1 HARQ, Interference Cancellation, and 4-Branch Antenna Diversity, Ph.D. thesis by Claudio Rosa, 2004, 180 pages.
Universal Mobile Telecommunications System (UMTS); Physical layer procedures (FDD) (3GPP TS 25.214 version 7.4.0 Release 7), ETSI TS 125 214 V7.4.0, 2007, 78 pages.
3rd Generation Partnership Project; Technical Specification Group Radio Access Network; Medium Access Control (MAC) protocol specification (Release 8), 3GPP TS 25.321 V8.4.0, 2008, 174 pages.

\* cited by examiner

*Primary Examiner* — Hassan Kizou
*Assistant Examiner* — Tejis Daya
(74) *Attorney, Agent, or Firm* — Rothwell, Figg, Ernst & Manbeck, P.C.

(57) ABSTRACT

In a cellular radio system, the number of TDM users per cell is limited. The cellular radio system can be a WCDMA system and in particular a WCDMA system employing an Enhanced Uplink (EUL). Other users in the cell are scheduled using CDM scheduling.

8 Claims, 7 Drawing Sheets

SCHEDULING METHOD

CROSS-REFERENCE TO RELATED APPLICATION

This application is a 35 U.S.C. §371 National Phase Entry Application from PCT/SE2009/050349, filed Apr. 3, 2009, and designating the United States.

TECHNICAL FIELD

The present invention relates to a method and a device for scheduling users in a cellular radio system.

BACKGROUND

Traditionally, Code Division Multiple Access (CDMA) systems such as Interim Standard-95 (IS-95) and Wideband Code Division Multiple Access (WCDMA) are designed to handle many low or medium bit rate users, creating a rather smooth and relatively slow changing interference. However, the current trend goes towards much more bursty traffic with high rate demands. Examples of application resulting in such behavior include for example World Wide Web (WWW) applications and peer-to-peer traffic. Such applications will generate highly varying data rates compared to speech and video services typically are associated with rather constant and moderate bit rates.

In WCDMA users are non-orthogonal to each other in the up link (UL) thereby generating interference between each other even within the same cell. Therefore the system has an upper interference limitation, where the cell noise can not be increased further if the system shall remain stable. This limits the maximum cell capacity.

Figure 1:
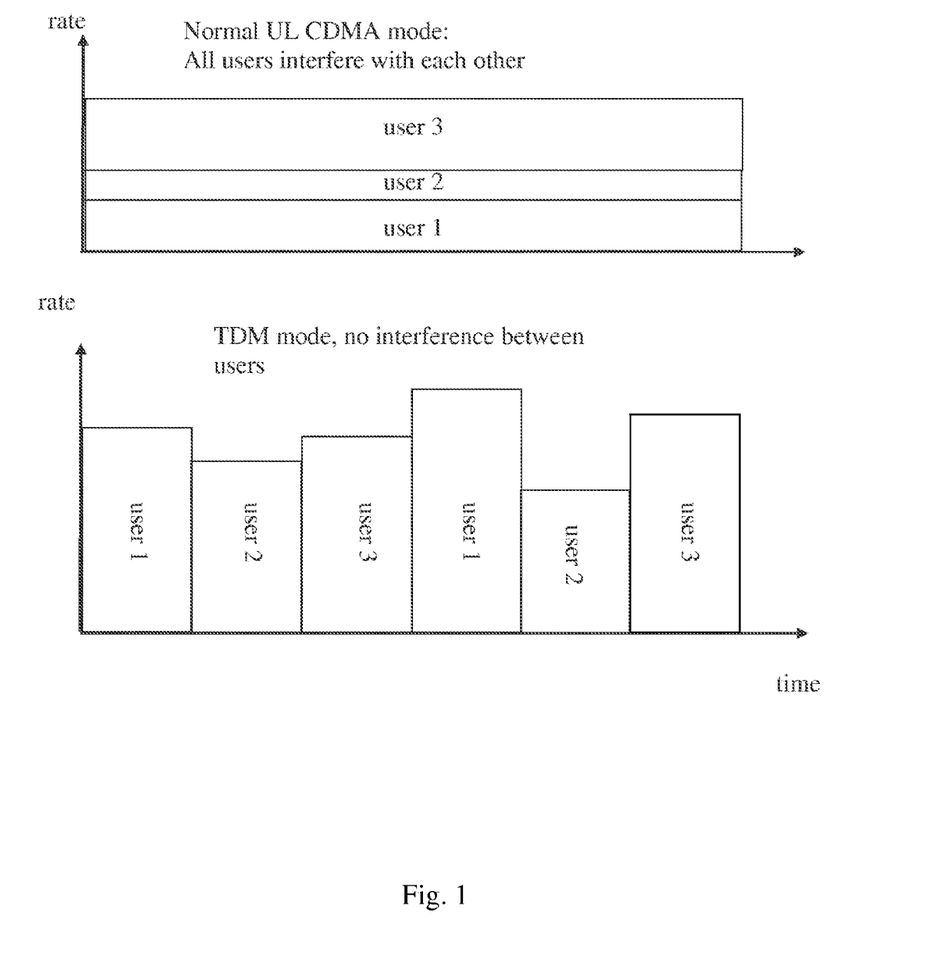
FIG. 1 is a view illustrating CDMA transmission and TDM transmission.

One way to handle both the more bursty traffic and the lack of orthogonality is to use Time-division between the users instead of codes, and thereby increase the UL WCDMA efficiency, see FIG. 1. In FIG. 1 the principle difference between normal code multiplexed scheduling and time division scheduling is schematically depicted for three users. As is apparent the use of a time division scheduling increases the possibility to transmit high data rates.

Time Division Multiple Access (TDMA) is a well-known method for divide the resources in cellular system.

Figure 2A:
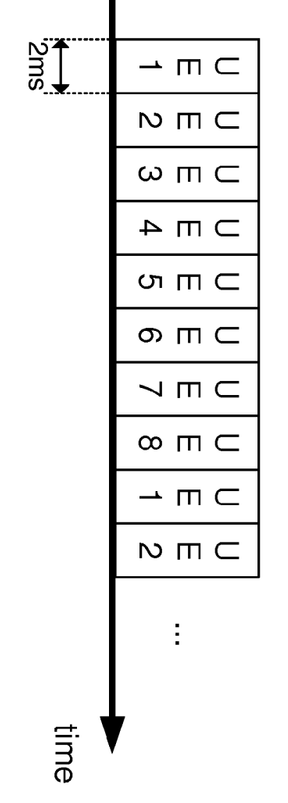
FIGS. 2a and 2b is a view illustrating different scheduling of TDM users.
Figure 2B:
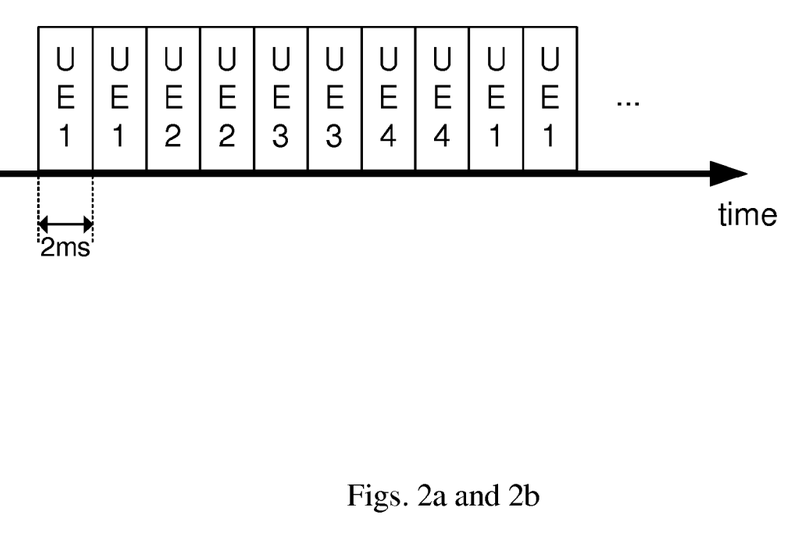

The basis of a TDM scheme for WCDMA Enhanced Uplink (EUL) with a 2 ms Transmission Time Interval (TTI), is depicted in FIG. 2a. The TDM users are typically scheduled per Hybrid Automatic Repeat Request (HARQ) process. In EUL there are 8 HARQ processes for a 2 ms TTI. As a result, if one user is scheduled for HARQ process x, it typically is x+8 TTIs until the next transmission. To use the same HARQ process number is efficient since if user has to retransmit, it can automatically use the previous HARQ process number for the retransmission, without having to perform any scheduling. It should also be noted that TDM users can also use two (or more) continuous HARQ processes, as shown in FIG. 2b.

When CDM is used, All HARQ process in accordance with 3GPP specification TS 25.321 is activated for the UE, i.e. as long as the UE has a grant greater than zero, it can use any HARQ process to transmit the data, until a grant zero (i.e. not allowed to transmit any data) is received. For the 2 ms TTI it is also possible to use the "Per HARQ process", see 3GPP specification TS 25.321, chapter 9.2.5.2.2. This can be used to achieve time division between users. Node-B schedule allocates only one user for each HARQ process, i.e. Node-B transmits an absolute grant to the UE which is valid for a specific HARQ process until a new grant is received. The valid HARQ process is decided by the CURRENT_HARQ_PROCESS_ID, see section 11.8.1.4 in 3GPP Specification TS 25.321.

Figure 3:
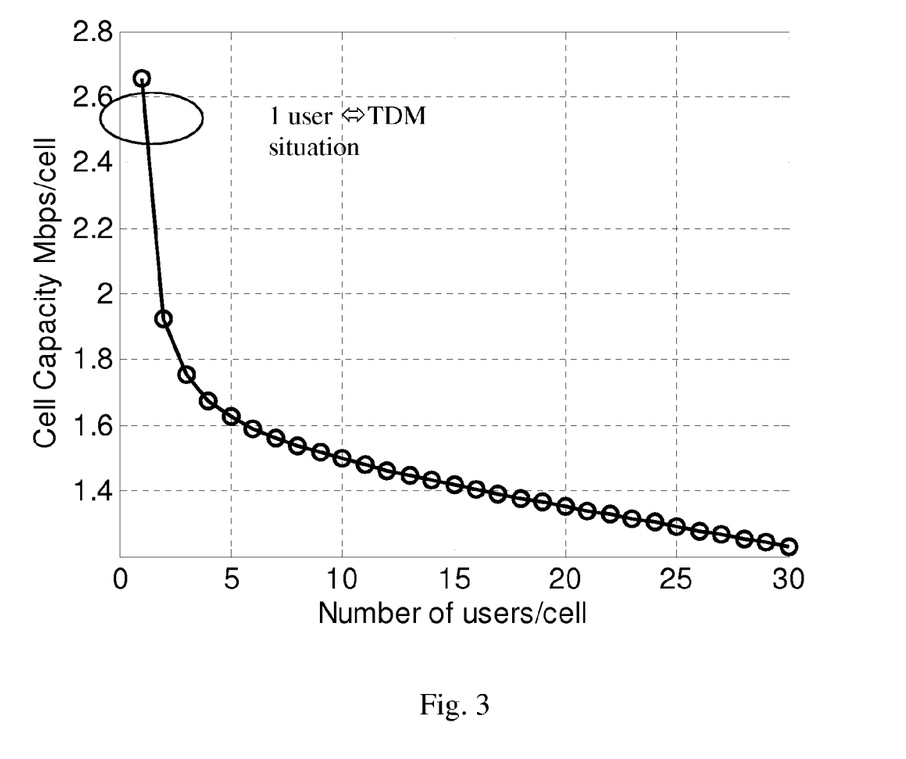
FIG. 3 is a view illustrating the utilization of bandwidth for different number of users in a cell.

Further, in FIG. 3 a rough estimate of the cell capacity for different number of users per cell using theoretical calculations is shown. In FIG. 3 it is assumed that the users transmit simultaneously, so that full buffers are assumed. FIG. 3 shows the big difference in terms of capacity between one user transmitting such as in a Time Division Multiplexing scheme and one or more users transmitting such as in a Code Division Multiplexing (CDM) scheme. As can be seen in FIG. 3, the lack of orthogonality between users in the same cell quickly decreases the possible cell capacity. A cell with TDM scheduling will be able to maintain the high cell throughput for more than one user. The TDM capacity will also decrease with the number of users, due to more control signaling and less efficient TDM scheduling, but much more slowly than for a CDM system. The aim with TDM is to even with quite many high data rate user be able to maintain the cell capacity.

A problem arising when using TDM scheduling for a EUL WCDMA system, is that the 3GPP specification makes it difficult to handle too many TDM users efficiently. Thus, when many TDM users use the up-link simultaneously there will be an unacceptably long time between the transmission attempts for each user. A long time between the transmission attempts for each user will negatively impact the user experiences because it:

gives bad throughput for TDM users—not able to reach high bit rates,
has a long ping time for first packet, and
is not acceptable for any time critical data.

Figure 4:
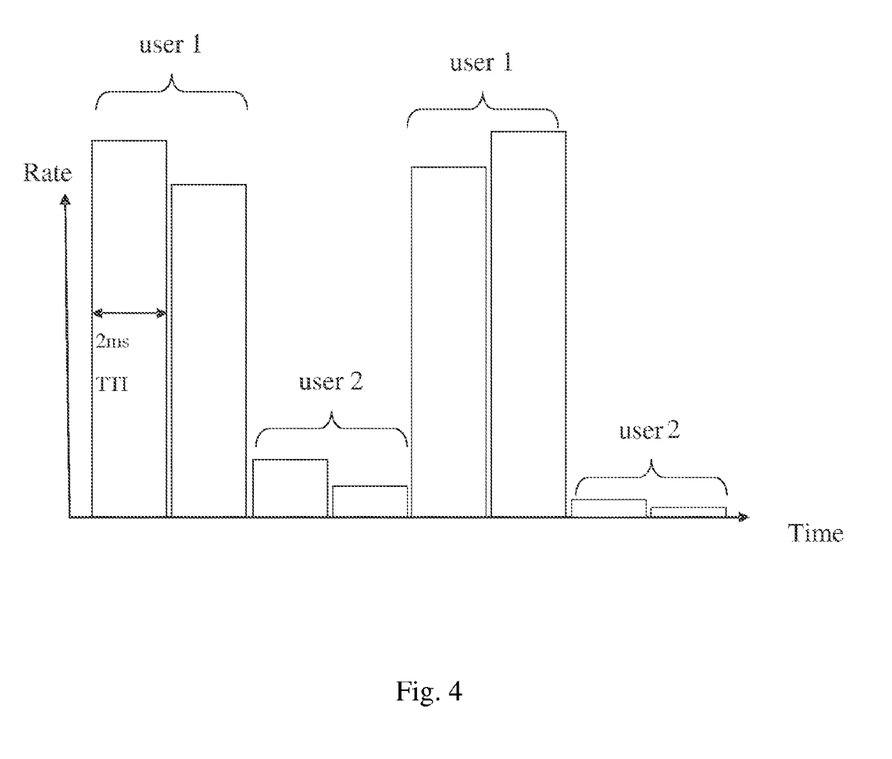
FIG. 4 is a view illustrating use of bandwidth for different types of applications.

Another problem is related to the fact that some TDM users are not utilizing the bandwidth available in a TDM scheme. Examples of such applications are Voice over IP (VoIP) and chat applications such as chat clients, email, presence etc. In FIG. 4, the problem is illustrated. As can been seen in FIG. 4 the user 2 is not fully utilizing the bandwidth provided in the TDM scheme.

There is a constant desire to improve the utilization bandwidth in radio communication. Hence there exists a need to improve the use of bandwidth in a cellular radio system, in particular a WCDMA radio system.

SUMMARY

It is an object of the present invention to improve the bandwidth utilization in radio communication.

This object and others are obtained by the method and device as set out in the appended claims.

Thus, in accordance with the present invention a limit to the number of TDM users per cell is provided in a cellular radio system, such as WCDMA system and in particular a WCDMA system employing an Enhanced Uplink (EUL). Other users in the cell are scheduled using CDM scheduling.

In accordance with one embodiment a method is provided in accordance with which users are moved from a CDM mode to a TDM mode if a user activity measurement is higher than a threshold value for a certain period of time.

In accordance with one embodiment a method is provided in accordance with which users are moved from a TDM mode to a CDM mode if a user activity measurement is lower than a threshold value for a certain period of time.

Hereby an efficient method for utilizing available bandwidth is obtained whereby users can be efficiently scheduled in both a TDM mode and a CDM mode simultaneously.

The invention also extends to a device and a node in a cellular radio system adapted to perform the method as described above.

BRIEF DESCRIPTION OF THE DRAWINGS

The present invention will now be described in more detail by way of non-limiting examples and with reference to the accompanying drawings, in which.

DETAILED DESCRIPTION

In accordance with the present invention a scheduler is provided, which is adapted to schedule users both in a CDM scheme and in a TDM scheme in response to available radio resources in a cell of a cellular radio system.

Figure 5:
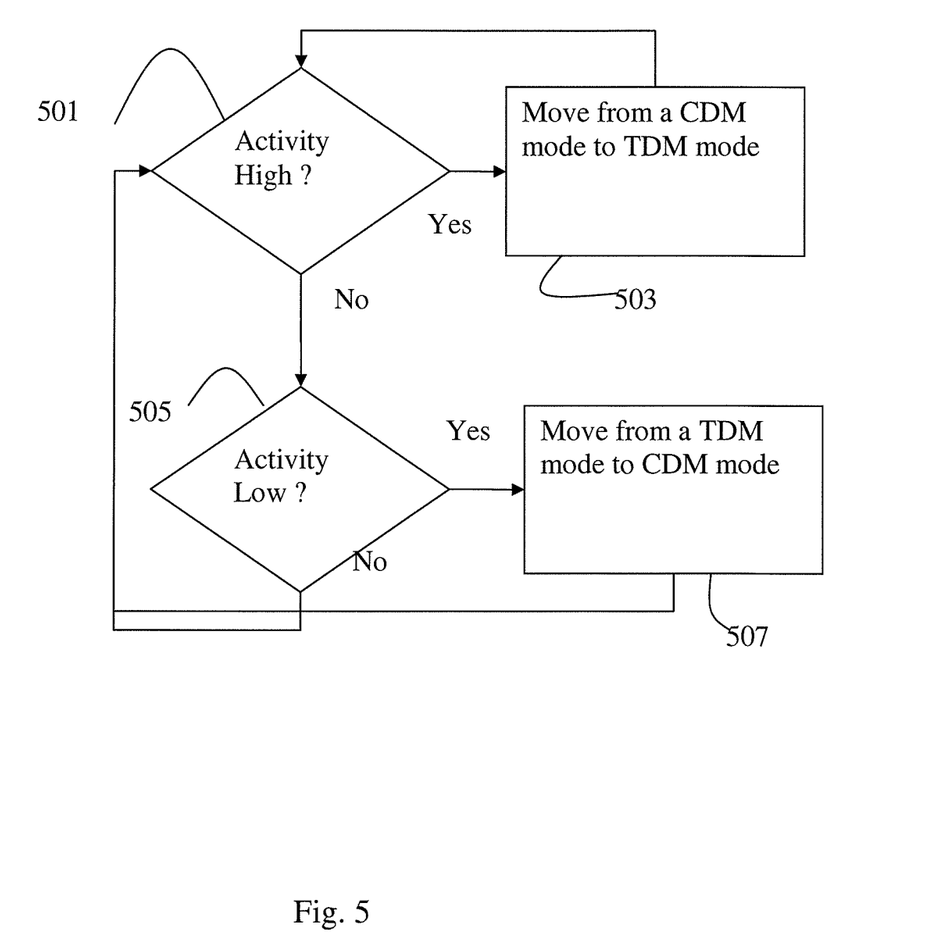
FIG. 5 is a flowchart illustrating procedural steps performed when scheduling users in a cellular radio system.

In FIG. 5 an exemplary flow chart illustrating logical steps performed in a scheduler for scheduling users in a cell is shown. The cellular radio system in which the scheduler schedules users can for example be a WCDMA system.

First in a step 501 it is checked if each user activity measurement is higher than a threshold value for a certain period of time. If the user activity is higher than the threshold value, the user is moved from a CDM mode to a TDM mode, in a step 503. Next in a step 505, it is checked if a user activity measurement is lower than a threshold value for a certain period of time. If the activity is lower than the threshold value users are moved from a TDM mode to a CDM mode in a step 507. The procedure can then be repeated by returning to step 501.

Figure 6:
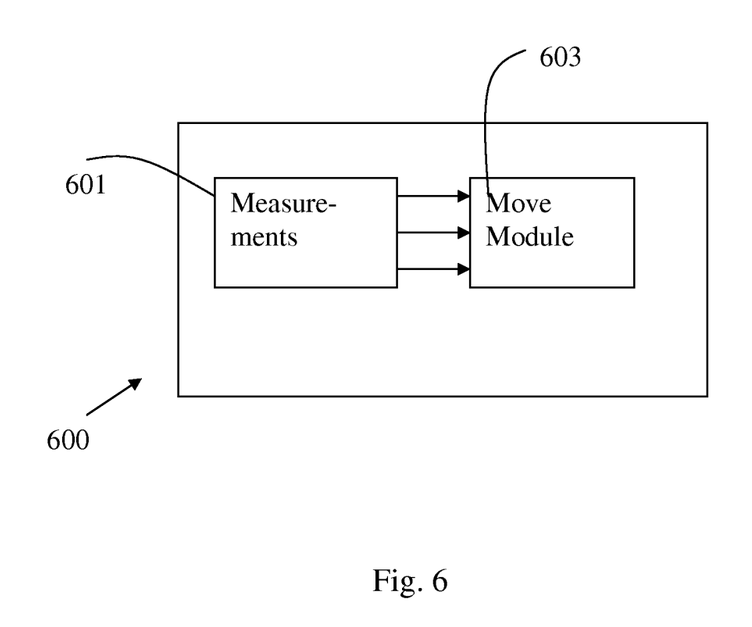
FIG. 6 is a scheduler adapted to schedule users.

In FIG. 6 an exemplary scheduler 600 is depicted. The scheduler 600 comprises a module 601 for providing measurements. The module 601 can in accordance with one embodiment comprise means for generating measurements within the scheduler. In accordance with another embodiment the module 601 is adapted to receive an external feed of measurements from another unit within the radio system. The scheduler 600 further comprises a user moving module 603 connected to the measurement module 601 adapted to move users of a cellular radio system between a CDM mode to a TDM mode. In particular the module 603 is adapted to move users between a CDM mode to a TDM mode in response to measurements provided by the measurement module 601.

Below different exemplary methods for measuring the activity of TDM and CDM users are described. These measurements can then be used to decide if a user should be assigned to TDM mode or CDM mode.

In order to measure the activity measurement to decide if a CDM user shall be moved to TDM mode, one or more of the following parameters for monitor each UE can be monitored:
given grants, or
estimate the rate used (in node B), or
estimated received power in node B,
a combination of above measurement In accordance with one embodiment an averaging window can be implemented, including periods of no transmission, to get the average activity.

In order to measure the activity measurement to decide if a TDM user shall be moved to CDM mode, one or more of the following parameters for monitor each UE can be monitored:
estimate the rate used (in node B), or
estimated received power in node B, or
a combination of above measurement The given grant can also be measured for the TDM users, but it can be less efficient, since it may be that the TDM scheduling assigns a higher grant to a TDM user that it is actually using.

In accordance with one embodiment, threshold decides if the CDM UE activity is high enough to be in TDM mode. The threshold can be fixed, but may also be a variable threshold. A variable threshold can for example be set up as a function of the TDM load in a cell. In accordance with one embodiment the variable threshold can be implemented as:

High TDM load→high activity needed to be in TDM mode
Medium TDM load→medium activity needed to be in TDM mode
Low TDM load→all EUL users allowed in TDM mode Another threshold can be set to decide when a TDM users' activity is low enough to be switched to the CDM mode. The threshold can be a constant, for example zero, or a variable threshold can be used such a s function of the TDM/CDM load as described above In accordance with another exemplary embodiment, the TDM slot resources are divided among the TDM users based on their activity. For example, if TDM user i has two times as high activity compared to TDM user j, TDM user I will get two times more TDM slots. The number of TDM slots a TDMN user can achieve can be expressed more general as:

$$\text{TDM\_slot}_i = \left\lceil 8 \cdot \frac{\text{activity}_i}{\sum \text{activity}} \right\rceil$$

Figure 7:
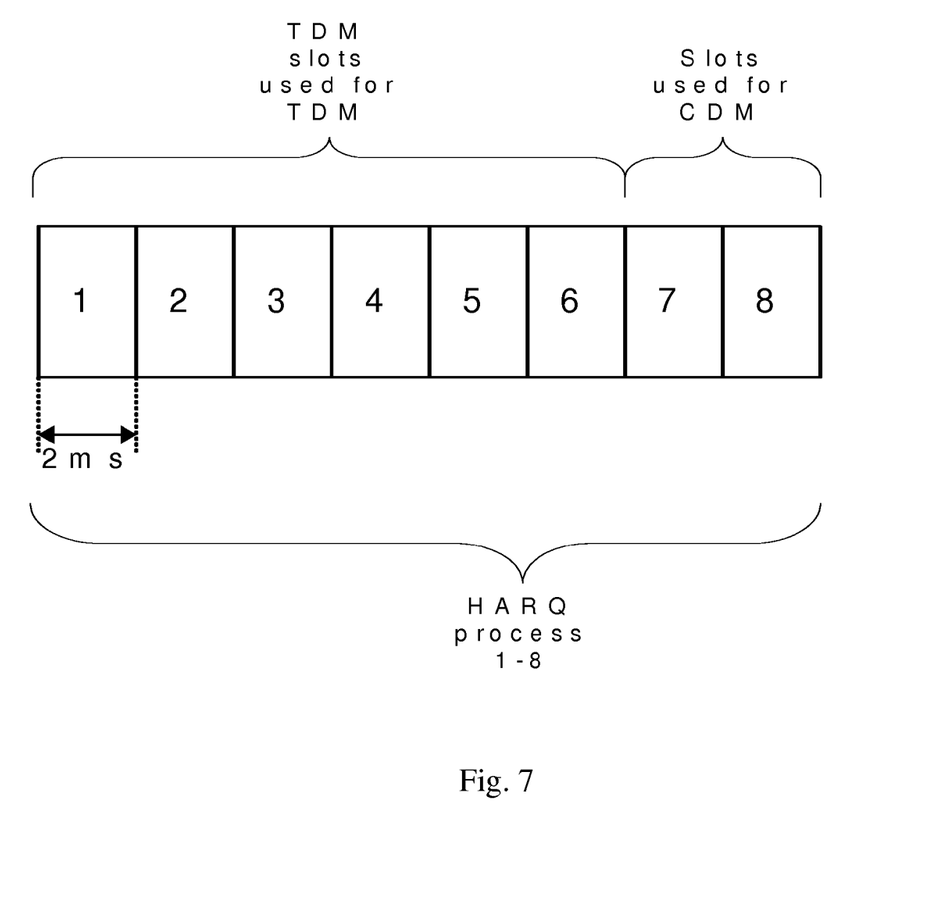
FIG. 7 is a view illustrating division of HARQ process numbers into TDM slots or CDM slots.

In accordance with another exemplary embodiment, the HARQ process numbers ("TDM slots") are divided into TDM slots or normal WCDMA (CDM) slots. This approach is depicted in FIG. 7. When the activity of a TDM user is below an activity threshold, it is assigned to the CDM slots. There can be more than one user assigned to these CDM slots, i.e. more than one user can be scheduled simultaneously at these CDM slots. If a user exceeds an activity threshold, it can instead be assigned to one of the TDM slots. For each TDM slot, there can only be assigned one single user, i.e. one user at a time can be scheduled at that TDM slot (HARQ process number).

By using the method a device as described herein it is possible to achieve a more efficient use of TDM resources. For example, it is possible to achieve high TDM user peak bit rates. It is further possible to obtain a higher total capacity. Further, in a scenario with high TDM load and many TDM users it is possible to switch the users with lowest activity to normal CDM scheduling in order to retain the peak bit rate for the remaining TDM users.

The invention claimed is:

1. A method of scheduling users by a base station, the method comprising:
providing, by the base station, connections for user equipments (UEs) using the base station via a radio interface, wherein the base station supports both connections to the UEs via Code Division Multiplexed connections in a Code Division Multiplexed mode, and via Time Division Multiplexed connections in a Time Division Multiplexed mode, and wherein providing the connections for the UEs comprises:
(a) scheduling, by the base station, a limited number of the UEs for a Time Division Multiplexed connection; and
(b) scheduling, by the base station, remaining UEs for a Code Division Multiplexed connection, wherein
step (a) comprises moving a UE from the Code Division Multiplexed mode to the Time Division Multiplexed mode in response to a determination that a user activity measurement is higher than a first threshold value, and
step (b) comprises moving a UE to the Code Division Multiplexed mode from the Time Division Multiplexed mode in response to a determination that a user activity measurement is lower than a second threshold value.

2. The method according to claim 1, further comprising the step of:
monitoring one or more of the following user activity measurements for a UE to decide if the UE is to be moved to a Time Division Multiplex mode: given grants, an estimation of the rate used in the base station, or an estimated received power in the base station or a combination of these user activity measurements.

3. The method according to claim 1, further comprising the step of:
monitoring one or more of the following user activity measurements for a UE to decide if the UE is to be moved to the Code Division Multiplex mode: given grants, an estimation of the rate used in the base station, or estimated received power in the base station or a combination of these user activity measurements.

4. The method according to claim 1, wherein the first or second threshold is a variable threshold.

5. The method according to claim 1, wherein the user activity measurement measures a variability of data rates used by a UE.

6. A method of scheduling user equipments (UEs) by a base station, the method comprising:
obtaining, by a base station, a measurement of a user activity level of a UE, the user activity level measuring a bit rate of traffic to or from the UE;
determining, by the base station, whether the user activity level exceeds a first threshold or is below a second threshold;
assigning, by the base station, a time division multiplexed (TDM) slot of the base station's cell to the UE in response to a determination that the user activity level exceeds the first threshold; and
assigning, by the base station, a code division multiplexed (CDM) slot of the base station's cell to the UE in response to a determination that the user activity level is below the second threshold.

7. The method of claim 6, further comprising assigning other TDM slots to the UE, wherein a total number of TDM slots assigned to the UE is based on a ratio of the user activity level of the UE to one or more user activity levels of one or more other UEs.

8. The method of claim 6, further comprising causing, based on the user activity level, the UE to switch between a TDM mode and a CDM mode.

* * * * *

UNITED STATES PATENT AND TRADEMARK OFFICE
CERTIFICATE OF CORRECTION

| | | |
|---|---|---|
| PATENT NO. | : 8,804,676 B2 | |
| APPLICATION NO. | : 13/260944 | |
| DATED | : August 12, 2014 | |
| INVENTOR(S) | : Ericson et al. | |

It is certified that error appears in the above-identified patent and that said Letters Patent is hereby corrected as shown below:

On the Title Page, in item (75), under "Inventors", in Column 1, Line 1,
delete "Marten Ericson, Lulea" and insert -- Mårten Ericson, Luleå --, therefor.

Signed and Sealed this
Twenty-sixth Day of May, 2015

Michelle K. Lee
*Director of the United States Patent and Trademark Office*